US009429055B2

(12) United States Patent
Ikeda

(10) Patent No.: US 9,429,055 B2
(45) Date of Patent: Aug. 30, 2016

(54) METHOD FOR PURIFICATION OF EXHAUST GAS FROM INTERNAL-COMBUSTION ENGINE

(75) Inventor: Masanori Ikeda, Himeji (JP)

(73) Assignees: UMICORE SHOKUBAI USA INC., Auburn Hills, MI (US); UMICORE SHOKUBAI JAPAN CO., LTD., Tokyo (JP)

( * ) Notice: Subject to any disclaimer, the term of this patent is extended or adjusted under 35 U.S.C. 154(b) by 499 days.

(21) Appl. No.: 11/826,365

(22) Filed: Jul. 13, 2007

(65) Prior Publication Data

US 2008/0010972 A1 Jan. 17, 2008

(30) Foreign Application Priority Data

Jul. 13, 2006 (JP) ................................. 2006-193072

(51) Int. Cl.
*F01N 3/035* (2006.01)
*F01N 3/025* (2006.01)
(Continued)

(52) U.S. Cl.
CPC ............ *F01N 3/035* (2013.01); *B01D 53/944* (2013.01); *B01J 23/44* (2013.01); *B01J 35/0006* (2013.01);
(Continued)

(58) Field of Classification Search
CPC .... F01N 3/021; F01N 3/0222; F01N 3/0224; F01N 3/023; F01N 3/0253; F01N 3/035; F01N 3/2033; F01N 2013/026; F01N 2510/0682; F01N 2610/03; B01J 23/42; B01J 23/44; B01J 23/464; B01J 37/0244
USPC ......... 60/273, 286, 295, 299, 300, 303, 320, 60/274
See application file for complete search history.

(56) References Cited

U.S. PATENT DOCUMENTS 5,100,632 A     3/1992   Dettling et al.
5,154,902 A * 10/1992   Inui et al. .................. 423/239.2
(Continued)

FOREIGN PATENT DOCUMENTS

CN          1064538 A     9/1992
EP         1 580 411 A1     9/2005
(Continued)

OTHER PUBLICATIONS

European Search Report dated Oct. 15, 2007.
(Continued)

*Primary Examiner* — Audrey K Bradley
(74) *Attorney, Agent, or Firm* — Buchanan Ingersoll & Rooney PC

(57) ABSTRACT

Provided is a method for extending a temperature range enabling combustion of high concentration hydrocarbon, or for rapidly supplying high temperature gas to a later stage catalyst. Provided is a method for purification of exhaust gas from an internal-combustion engine comprised by: providing a temperature-raising catalyst for exhaust gas from an internal-combustion engine in an exhaust gas passage of the internal-combustion engine, along flow of said exhaust gas, at the upstream side of a purification catalyst for said exhaust gas; and introducing hydrocarbon in an amount of 1,000 to 40,000 ppm, as converted to methane, from the upstream side of the temperature-raising catalyst, wherein said temperature-raising catalyst has catalytically active components supported onto a refractory three-dimensional structure, wherein concentration of said components has a gradient such that said concentration gradually becomes lower from the inflow side toward the outflow side of said exhaust gas.

16 Claims, 10 Drawing Sheets

(51) Int. Cl.
*B01J 23/42* (2006.01)
*B01J 23/44* (2006.01)
*B01J 23/46* (2006.01)
*B01D 53/94* (2006.01)
*B01J 35/00* (2006.01)
*B01J 37/02* (2006.01)
*F01N 3/08* (2006.01)
*F01N 13/00* (2010.01)
*F01N 3/20* (2006.01)

(52) U.S. Cl.
CPC .......... *B01J 37/0244* (2013.01); *F01N 3/0253* (2013.01); *F01N 3/0814* (2013.01); *F01N 3/0842* (2013.01); *F01N 13/0097* (2014.06); *B01D 2251/208* (2013.01); *B01D 2255/91* (2013.01); *F01N 3/2033* (2013.01); *F01N 2510/0682* (2013.01); *F01N 2610/03* (2013.01)

(56) References Cited

U.S. PATENT DOCUMENTS

| | | | |
|---|---|---|---|
| 5,248,251 A * | 9/1993 | Dalla Betta et al. | 431/7 |
| 5,462,905 A * | 10/1995 | Nagami et al. | 502/232 |
| 5,958,095 A | 9/1999 | Yoro et al. | |
| 6,186,844 B1 | 2/2001 | Yonezawa et al. | |
| 6,327,851 B1 * | 12/2001 | Bouchez et al. | 60/286 |
| 6,399,035 B1 * | 6/2002 | Tabata et al. | 423/213.5 |
| 7,707,473 B2 | 4/2010 | LaBerge et al. | |
| 2003/0083193 A1 | 5/2003 | Takaya et al. | |
| 2003/0230076 A1 | 12/2003 | Kwon | |
| 2004/0055287 A1 | 3/2004 | Sato et al. | |
| 2006/0288689 A1 * | 12/2006 | Shimoda | 60/275 |
| 2009/0056318 A1 * | 3/2009 | Ikeda et al. | 60/297 |

FOREIGN PATENT DOCUMENTS

| | | |
|---|---|---|
| EP | 1 820 945 A1 | 8/2007 |
| JP | 60-043113 A | 3/1985 |
| JP | 2953409 B2 | 9/1999 |
| JP | 2003-200049 A | 7/2003 |
| JP | 2004-108207 A | 4/2004 |
| JP | 3747639 B2 | 2/2006 |
| WO | WO 2004/104385 | 12/2004 |
| WO | WO 2006/046389 A1 | 5/2006 |
| WO | WO 2006/056811 A1 | 6/2006 |

OTHER PUBLICATIONS

Naoki Baba et al., "Numerical Approach for Improving the Conversion Characteristics of Exhaust Catalysts Under Warming-Up Condition", SAE Special Publication, vol. 1207, Oct. 1996, pp. 141-156, XP-009066729 (cited in European Search Report).

Office Action issued on Nov. 9, 2010, in corresponding Chinese Patent Application No. 200710135805.7 and English translation thereof.

Office Action issued on Oct. 10, 2011, in corresponding Chinese Patent Application No. 200710135805.7 and English translation thereof.

Office Action issued on May 15, 2013 in corresponding Korean Patent Application No. 10-2007-0069771 and an English translation thereof.

Office Action issued on Jan. 23, 2013 in corresponding Canadian Patent Application No. 2,593,547.

* cited by examiner

FIG.2
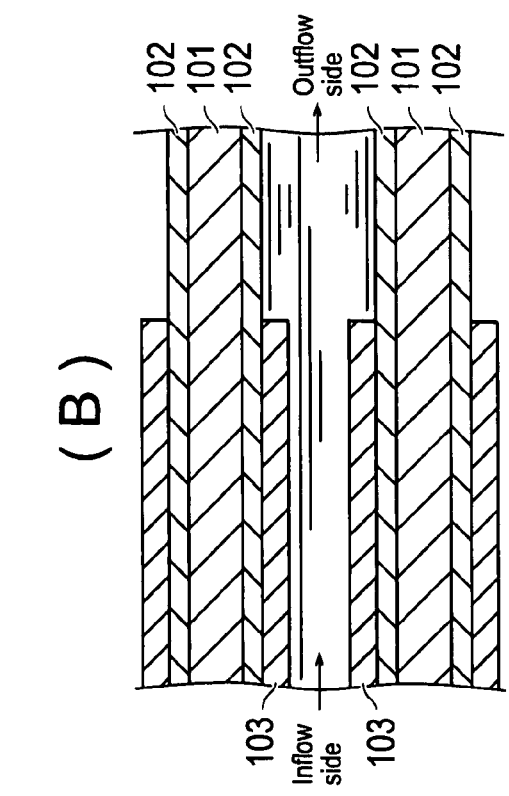
(A)
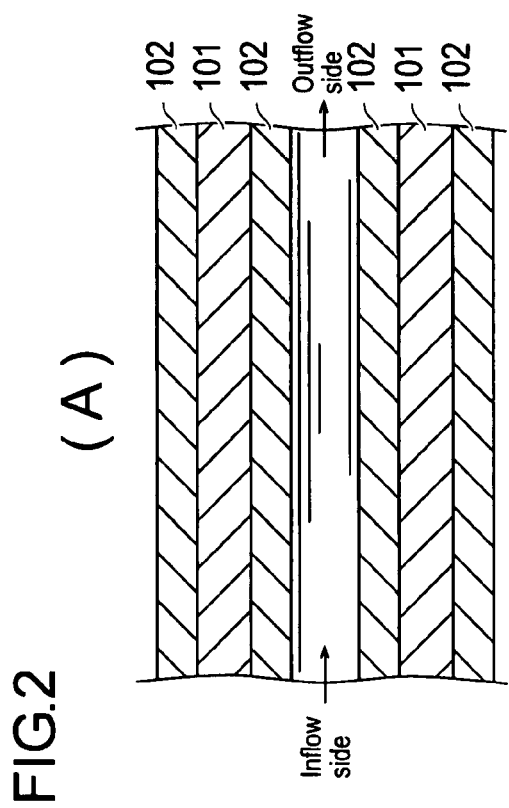
(B)
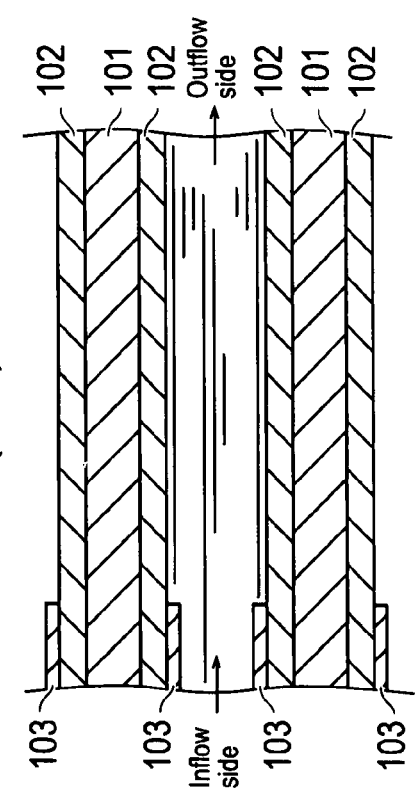
(C)
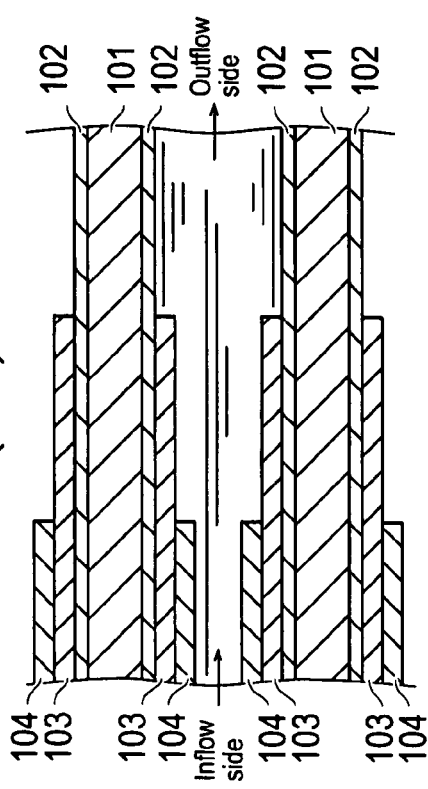
(D)

METHOD FOR PURIFICATION OF EXHAUST GAS FROM INTERNAL-COMBUSTION ENGINE

BACKGROUND OF THE INVENTION

1. Field of the Invention

The present invention relates to a method for purification of exhaust gas from an internal-combustion engine. In more detail, the present invention relates to a method for purification excellent in removing particulates and the like from exhaust gas of an internal-combustion engine, in particular, a diesel engine or the like, and also in removing sulfur compounds and the like in a NOx storage catalyst.

2. Description of the Related Art

A diesel particulate filter is used to collect PM (particulate matter) such as black smoke or SOF or the like, exhausted from an internal-combustion engine like a diesel engine or the like; which poses a problem of deposition of PM in the filter and thus increases pressure loss, accompanying with use thereof.

To overcome this problem, regeneration of the filter has conventionally been executed, by arrangement of a heating apparatus such as an electric heater or the like at the filter, so as to combust and remove PM by heating (Japanese Patent No. 2953409).

However, such a regeneration method had a problem of increased power consumption and high running cost. In addition, space occupied by a heating apparatus as well as a filter is required, which posed a problem of limitation in mounting place for mounting the apparatus in a vehicle. To solve these problems, an purification apparatus for diesel exhaust gas, provide wit ha filter for collecting diesel engine particulates, a catalyst converter with good activity for hydrocarbon (HC), mounted at the upstream side of an exhaust gas pipe of the filter, and a HC control unit which is capable of supplying a large quantity of HC to the catalyst converter has been proposed, and as the catalyst, platinum, palladium, rhodium or the like is disclosed (JP-A-60-043113).

In addition, a filter for diesel exhaust gas particulate coated with catalyst components thereon, is also disclosed (U.S. Pat. No. 5,100,632).

Furthermore, such a purification system of exhaust gas from an internal-combustion engine has also been proposed that is provided with a continuous regeneration type diesel particulate filter at an exhaust gas passage of an internal-combustion engine, for removing particulate substances collected, by executing a regeneration mode operation, when collected amount of the particulate substances in the filter for collecting the particulate substances is equal to or higher than a predetermined determination value, wherein the system being provided with a collecting amount prediction unit for predicting collected amount of particulate substances collected in the filter, and a maximal injection amount control unit for controlling the maximal injection amount of an internal-combustion engine, when the particulate substances predicted by the collecting amount prediction unit is equal to or higher than the predetermined determination value (JP-A-2004-108207).

In addition, it is known that, in a method for removing nitrogen oxide, catalytic performance is reduced by accumulating sulfur oxides like SOx to a NOx storage catalyst used in removal of NOx or the like, and a regeneration method, also in recovering performance thereof, by introducing a large quantity of hydrocarbon to raise temperature has been proposed, however, this method limits a temperature range suitable to regeneration (Japanese Patent No. 3747639).

In addition, it is disclosed that exhausted hydrocarbon can be efficiently purified at a low temperature region at engine start, by using a catalyst supporting different amount of catalyst and catalyst components at the inflow side and the outflow side on the same catalyst. This catalyst has features in that HC is temporarily adsorbed by a HC adsorbing material at low temperature where catalytic activity is not exerted, like in an engine start region, and HC is purified when catalytic activity is exerted by temperature increase, and in that oxygen release amount is set higher in the upstream side than in the downstream side. And, it is desirable that content of a noble metal is higher in the outflow side than in the inflow side of exhaust gas. However, in the case where content of a noble metal is higher at the outflow side than at the inflow side of exhaust gas as described above, as shown in FIG. 6, effect of enhancing combustion performance of high concentration hydrocarbon cannot be exerted. In addition, in the present invention, as shown in FIG. 4 and 5, a catalyst providing higher decrease amount of HC concentration increases $CO_2$ concentration more. These results indicate that a combustion reaction as shown in chemical equation (A) occurs, different from a temporal adsorption of HC (JP-A-2003-200049).

$$CxHy + \left(x + \frac{y}{4}\right)O_2 \rightarrow xCO_2 + \frac{y}{2} H_2O \qquad (A)$$

SUMMARY OF THE INVENTION

The methods described in the above literature have advantages of lower production cost and also moderation in limitation of mounting space, as compared with a method by an electric heater or the like. However, the methods has a problem of requiring supply of a large quantity of hydrocarbon, and poisoning by adhering of hydrocarbon onto a catalyst, caused by supplying a large quantity of hydrocarbon. This hydrocarbon poisoning tends to be generated easily in the case where hydrocarbon is supplied in a condition that temperature of a temperature-raising catalyst region at the time of supplying hydrocarbon is equal to or lower than boiling point of hydrocarbon supplied, and also tends to be generated more easily at higher concentration of hydrocarbon. This is because low temperature of a temperature-raising catalyst region delays combustion reaction rate of hydrocarbon and high concentration of hydrocarbon provides faster supplying rate of hydrocarbon than combustion treatment rate of the temperature-raising catalyst. Therefore, a conventional method requires control of supplying hydrocarbon after raising temperature so that combustion reaction rate of hydrocarbon becomes fast, by control of an engine side, or supplying small amount so that hydrocarbon can be sufficiently combusted. However, control in this way lengthens time till regeneration and gives bad effect on running performance or environment. On the other hand, in the case where a large quantity of hydrocarbon is supplied at low temperature without executing such control, poisoning by hydrocarbon onto a catalyst tends to be generated easily, and decreased catalytic performance caused by poisoning by hydrocarbon incurs exhaustion of a large quantity of hydrocarbon, because of no combustion of hydrocarbon introduced thereafter. As a result, in the case where a diesel particulate filter is mounted at the later stage, PM collected in the diesel particulate filter will not be combusted, and accumulation of soot progresses, and could result in engine stop, because high temperature exhaust gas is not supplied. In addition, in the case where a NOx storage catalyst is mounted at the later stage, removal of sulfur oxides accumulated onto the NOx storage catalyst by high temperature exhaust gas is required, however, an accumulation state of sulfur oxides and a state of decreased NOx purification performance are continued, thus incurring exhaustion of NOx, because high temperature exhaust gas is not supplied. In view of such circumstance, it is a challenging item to enhance temperature-raising performance of exhaust gas by enhancement of combustion performance for high concentration hydrocarbon even at low temperature.

Therefore, it is an object of the present invention to provide a novel method for raising temperature of exhaust gas from an internal-combustion engine.

It is another object of the present invention to provide a method for purification excellent in also removing particulates and the like from exhaust gas from an internal-combustion engine, in particular, a diesel engine or the like.

It is further another object of the present invention to provide a method for excellent purification of exhaust gas in also removing sulfur oxides in using a NOx storage catalyst.

It is still further another object of the present invention to provide a method for purification of exhaust gas from an internal-combustion engine, which is a system for supplying high concentration hydrocarbon-based fuel, and is capable of regenerating a filter stably for a long period.

The above objects are attained by the following (1) to (13).

(1) A method for purification of exhaust gas from an internal-combustion engine comprised by:
providing a temperature-raising catalyst for exhaust gas from an internal-combustion engine in an exhaust gas passage of the internal-combustion engine, along flow of said exhaust gas, at the upstream side of a purification catalyst for said exhaust gas; and
introducing hydrocarbon in an amount of 1,000 to 40,000 ppm, as converted to methane, from the upstream side of the temperature-raising catalyst,
wherein said temperature-raising catalyst has catalytically active components supported onto a refractory three-dimensional structure, wherein concentration of said components has a gradient such that said concentration gradually becomes lower from the inflow side toward the outflow side of said exhaust gas.

(2) The method according to (1), wherein said temperature-raising catalyst has a catalyst component supported on said refractory three-dimensional structure, which catalyst component being catalytically active components (A) comprising at least one kind of a noble metal selected from the group consisting of platinum, palladium and rhodium, supported onto refractory inorganic oxide powders (B).

(3) The method according to (1) or (2), wherein said gradient is formed stepwise.

(4) The method according to (2) or (3), wherein a supporting amount of the catalytically active components (A) in said temperature-raising catalyst is 0.2 to 20 g/l, and supporting amount of said refractory inorganic oxide powders (B) is 10 to 300 g/l.

(5) The method according to any one of the above (2) to (4), wherein the supporting amount of the catalytically active components (A) of the catalyst component, in said temperature-raising catalyst, in 10 to 66.7% of the total length from the inflow side of said exhausted gas on said refractory three-dimensional structure, is 20 to 80% of total catalytically active components (A), and the supporting amount of the catalytically active components (A) in 50% of the length of the inflow side is more than the supporting amount of the catalytically active components (A) in 50% of the outflow side.

(6) The method according to any one of the above (2) to (4), wherein the supporting amount of the catalytically active components (A) of in the temperature-raising catalyst, in 30 to 66.7% of the total length from the inflow side of the exhausted gas on the refractory three-dimensional structure, is 50 to 80% in total, and the supporting amount of the catalytically active components (A) in 50% of the length of the outflow side is more than the supporting amount of the catalytically active components (A) in 50% of the outflow side.

(7) The method according to any one of the above (1) to (6), wherein introduction temperature of the hydrocarbon is 200 to 350° C.

(8) The method according to any one of the above (1) to (7), wherein introduction amount of the hydrocarbon is 5,000 to 30,000 ppm, as converted to methane, relative to the exhaust gas.

(9) The method according to any one of the above (1) to (8), wherein the exhaust gas temperature-raising catalyst also has capability of exhaust gas purification.

(10) The method according to any one of the above (1) to (9), comprised by providing an exhaust gas purification catalyst at the downstream side of the exhaust gas temperature-raising catalyst, relative to stream of the exhaust gas.

(11) The method according to the above (10), wherein the exhaust gas purification catalyst is at least one kind selected from the group consisting of a diesel particulate filter, an oxide catalyst and a NOx storage catalyst.

(12) The method according to any one of the above (1) to (11), wherein the three-dimensional structure of the exhaust gas temperature-raising catalyst is a honeycomb and/or a plug honeycomb or a pellet.

(13) The method according to any one of the above (1) to (12), wherein the three-dimensional structure of the exhaust gas purification catalyst is a honeycomb and/or a plug honeycomb or a pellet.

The present invention has the above construction, and the invention has, as the temperature-raising catalyst, a catalytically active component supported onto the refractory three-dimensional structure, wherein concentration of said components has a gradient such that said concentration gradually becomes lower from the inflow side toward the outflow side of said exhaust gas, and thus presence of high concentration catalytically active components at the inflow region results in suppression of poisoning by hydrocarbon at the inflow region caused by high concentration hydrocarbon, combustion of a part of the introduced hydrocarbon, and rise of catalyst temperature. In addition, at the region entering the outflow side of exhaust gas from the inflow region, combustion of hydrocarbon at the inflow region decreases hydrocarbon concentration in that region, and increase in temperature of exhaust gas by combustion at the inflow region are considered to provide condition for easier progress of hydrocarbon combustion than at the inflow region. Therefore, poisoning by hydrocarbon is suppressed by fewer amounts of catalytically active components than at the inflow region in that area, and hydrocarbon is combusted, and furthermore, temperature of exhaust gas is raised. Similarly, there is advantage of being capable of suppressing poisoning by hydrocarbon, and raising temperature of exhaust gas, by supporting catalytically active components with concentration gradient so that the concentration becomes lower toward the outflow side as compared with the inflow side.

On the other hand, in the case where catalytically active components are supported with concentration gradient so that the concentration becomes lower from the outflow side toward the inflow side, increase in temperature of exhaust gas as shown in FIG. 6 seldom occurs. In view of such point, effect of highly efficient combustion of high concentration hydrocarbon at the inflow side is an important item, and the present invention is capable of providing stable combustion of hydrocarbon, and stably increasing temperature of exhaust gas, also after long period of service or being exposed to high temperature exhaust gas, because of providing significant effect for this problem. In addition, in the case where the diesel particulate filter is mounted at the later stage of the temperature-raising catalyst, therefore, the filter can be regenerated stably for a long period, and similarly in the case where the NOx storage catalyst is mounted at the later stage of the temperature-raising catalyst, removal of accumulated sulfur oxides by combustion can be stably executed. In addition, in a driving condition that hydrocarbon concentration in flowing to temperature-raising catalyst is equal to or lower than 1000 ppm, the purification performance of exhaust gas is equal or better when catalytically active components are supported with concentration gradient lowered from the inflow side toward the outside than without concentration gradient.

The above and other objects, features and advantages of the present invention will become clear from the following description of the preferred embodiments.

BRIEF DESCRIPTION OF DRAWING(S)

FIG. 1 is a schematic drawing showing outline of a purification apparatus of exhaust gas according to the present invention.

FIGS. 2(A) to 2(D) are schematic cross-sectional views of a temperature-raising catalyst used each in comparative example 1 and examples 1-3.

Figure 6:
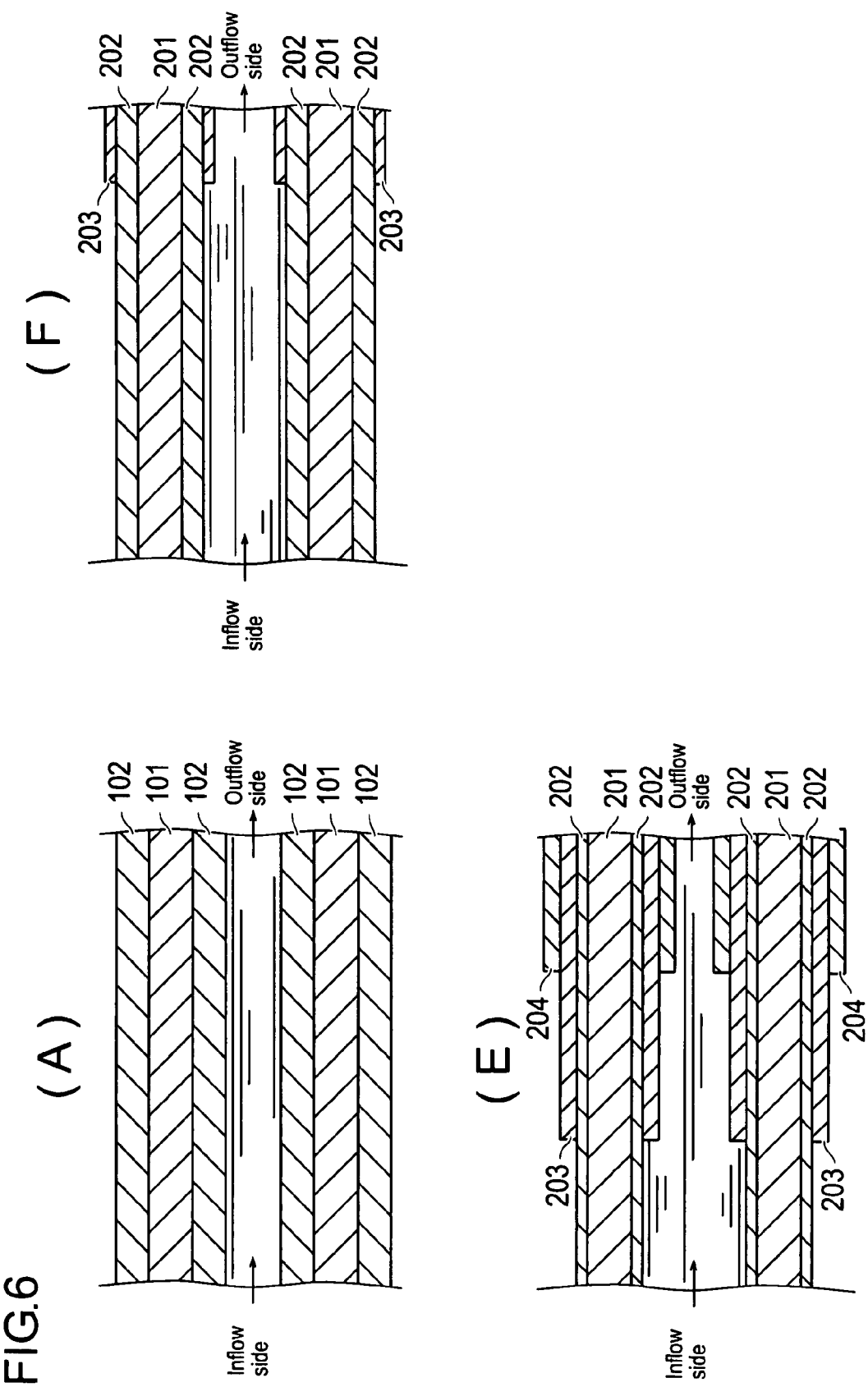

FIGS. 6(A), FIG. 6(E) and FIG. (6F) are schematic cross-sectional views of catalysts of Comparative Examples.

Figure 7:
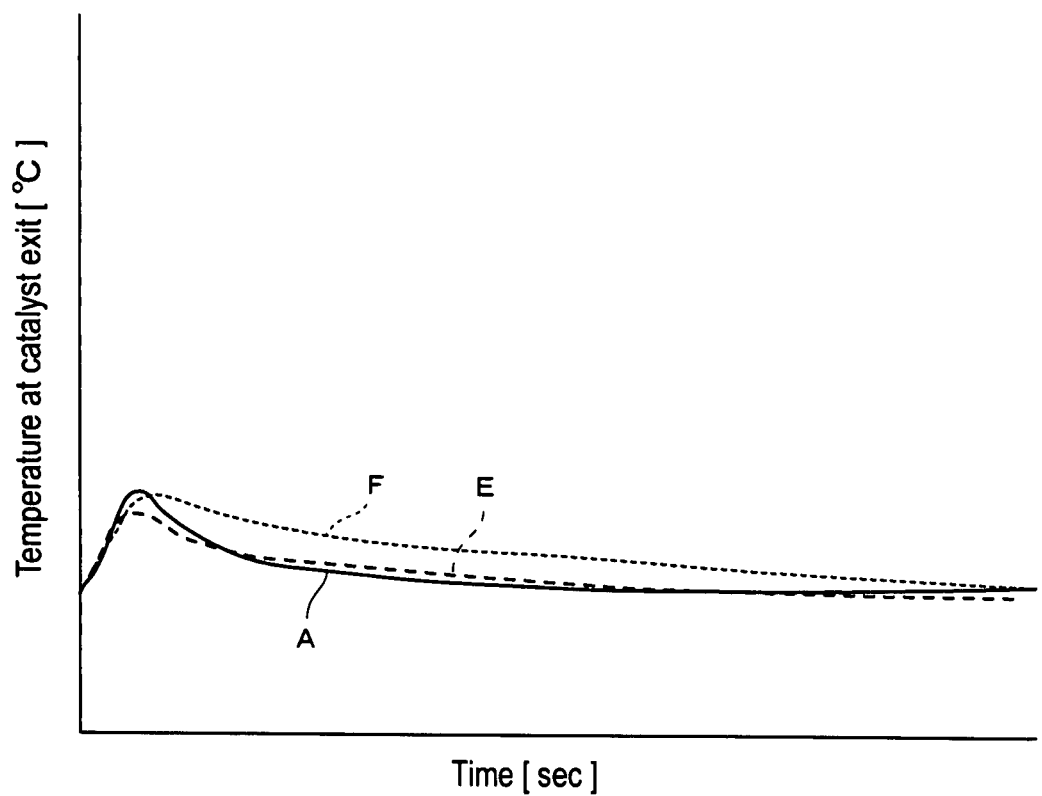

FIG. 7 is a graph showing relationship between temperature at the exit of catalyst and time, in the addition of hydrocarbon, using a catalyst of a Comparative Example.

Figure 8:
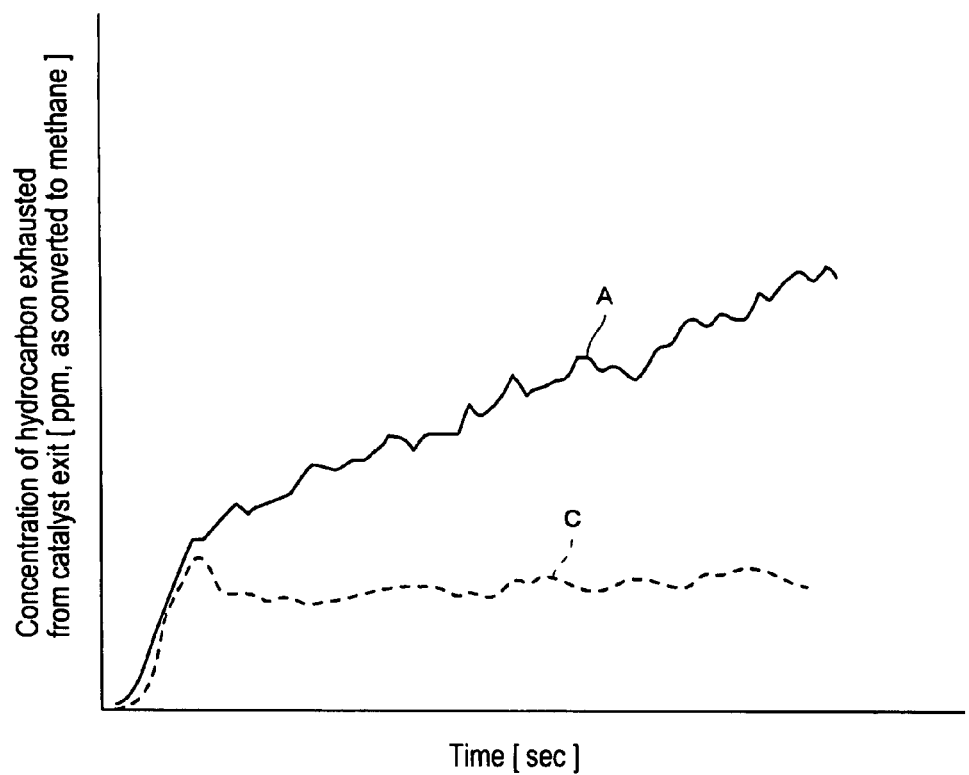

FIG. 8 is a graph showing relationship between concentration of hydrocarbon exhausted from the exit of catalyst and time, in the addition of hydrocarbon, using a catalyst of a Comparative Example.

Figure 9:
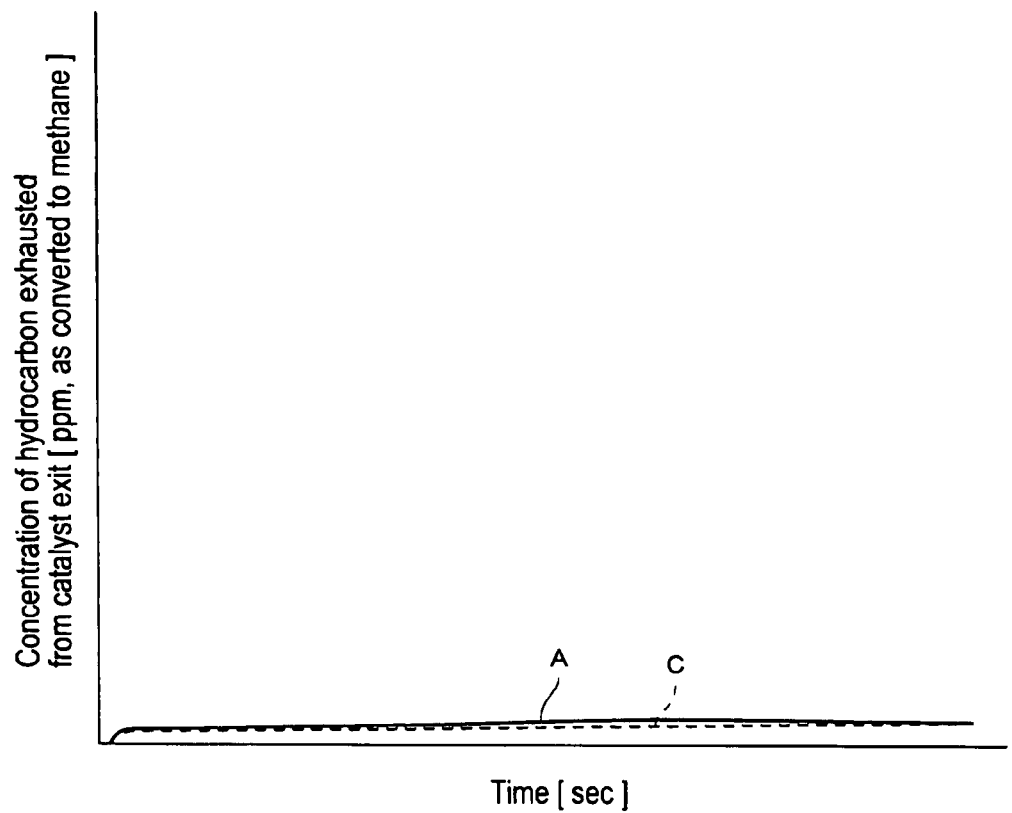

FIG. 9 is a graph showing relationship between concentration of hydrocarbon exhausted from the exit of catalyst and time, in the addition of hydrocarbon, using a catalyst of a Comparative Example.

Figure 10:
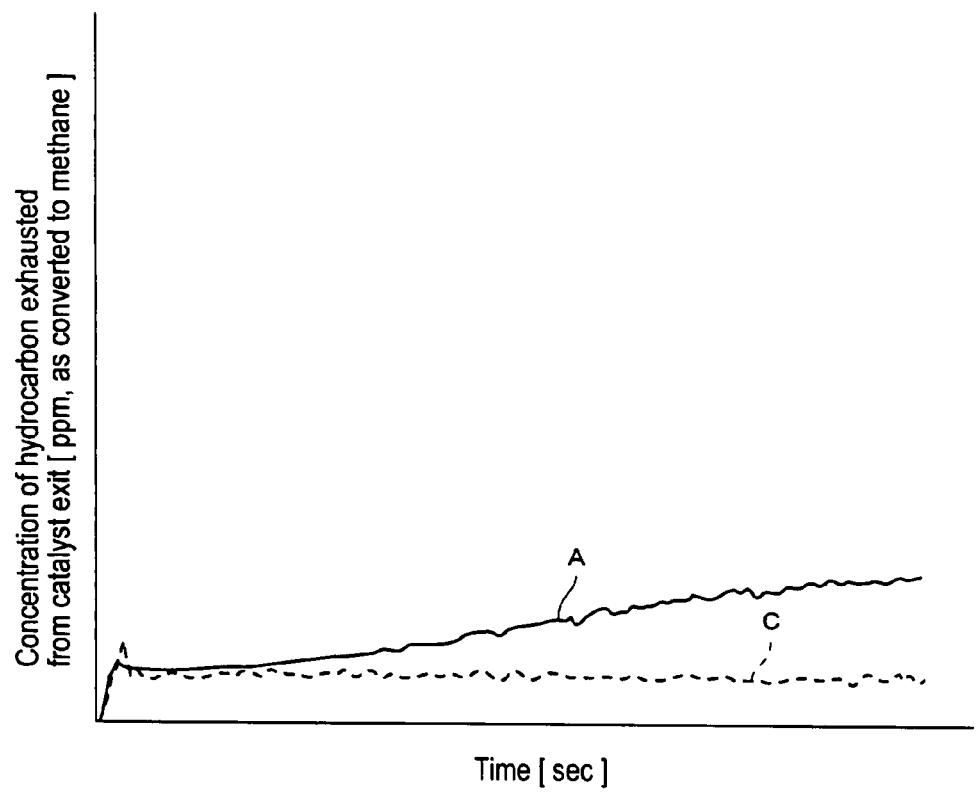

FIG. 10 is a graph showing relationship between concentration of hydrocarbon exhausted from the exit of catalyst and time, using a catalyst of a Comparative Example.

DETAILED DESCRIPTION OF THE PREFERRED EMBODIMENT(S)

Figure 1:
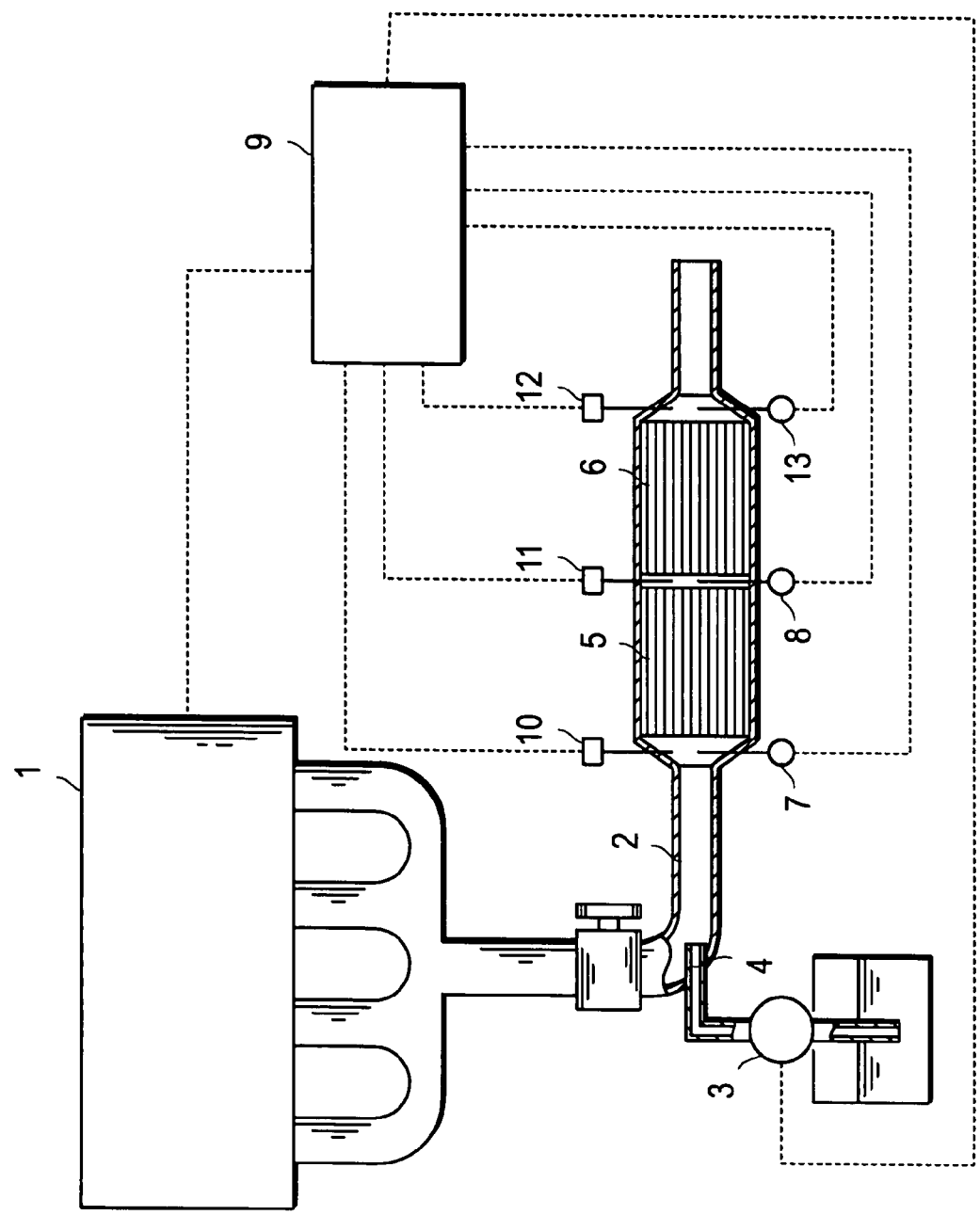

Then, explanation will be given on the present invention in further detail with reference to a drawing; namely, FIG. 1 shows schematic drawing of a purification apparatus of exhaust gas from an internal-combustion engine, according to the present invention.

Namely, in the present invention, the internal-combustion engine 1, the exhaust gas pipe 2 communicating to, for example, a diesel engine, and further in a communicated state, the temperature-raising region 5 filled with the temperature-raising catalyst, and in a communicated state to the downstream side thereof, the filtering region 6 mounted with the particulate filter are provided. And, at the exhaust gas pipe 2 at the inflow side of exhaust gas of the temperature-raising region 5, the fuel supply nozzle 4 mounted with a check valve or the like (not shown), if necessary, and the fuel supply pump 3 communicated with the nozzle 4 are provided, as means for supplying hydrocarbon-based liquid fuel for raising temperature.

An exhaust gas purification apparatus configured in this way is provided with the temperature sensor 7 and the pressure sensor 10 each at the entrance part of the catalyst, and the temperature sensor 8 and the pressure sensor 11 each at the exit part, and further, if necessary, the temperature sensor 13 and the pressure sensor 12 each at the exit of the filter region 6 provided with the filter so that temperature and pressure at the entrance part and the exit part of the catalyst can be measured if necessary. In addition, a signal of each of these temperature sensors and the pressure sensors is connected so as to be input to the controller 9, and the signal of the controller 9 is connected so as to be input to a pump.

In addition, as the other embodiment of the present invention, fuel may also be directly supplied to a cylinder of the internal-combustion engine 1, for example, a diesel engine, by the signal of the controller 9, without mounting of the pump 3 and the fuel supply nozzle 4. For example, hydrocarbon-based liquid (fuel) may be supplied after completion of combustion of fuel in a cylinder of an internal-combustion engine, and before the gas exhaustion step.

Then explanation will be given on action of the purification apparatus of exhaust gas, configured in this way. Namely, as shown in FIG. 1, exhaust gas from the internal-combustion engine 1, for example, a diesel engine, passes through the exhaust gas pipe 2, and in the temperature-raising region 5 filled with the temperature-raising catalyst, high concentration and non-combusted hydrocarbon (HC) contained in the exhaust gas is combusted to water and carbon dioxide, and exhausted to outside of system via a muffler (not shown) or the like, through the filtering region 6 filled with a filter.

On the other hand, particulates contained in the exhaust gas are collected in a particulate filter at the filtering region 6, however, gradual accumulation thereof increases pressure on the filter, and at the time when the pressure value reaches a predetermined level and temperature of the filter reaches a predetermined level, hydrocarbon-based liquid fuel is injected from the nozzle 4 and supplied onto the temperature-raising catalyst 5 at the temperature-raising region 5. The pressure sensor 11 mounted between the temperature-raising region 5 and the filtering region 6 is designed to measure pressure at the filtering region 6, and when the measurement value reaches equal to or higher than the predetermined pressure, the fuel supply pump 3 is actuated by command of the controller 9, based on the value received, and in addition, when the pressure becomes equal to or lower than the predetermined pressure, operation of the pump 3 is stopped by command of the controller 9.

In addition, in the case where the temperature sensor 8 mounted between the temperature-raising region 5 and the filtering region 6 shows value over the predetermined value, for example over 700° C., action of the fuel supply pump 3 is stopped, by command of the controller 9; and for example, in the case of light oil, temperature at which 90% or more of the components thereof becomes boiling point or over is about 330° C., and because high boiling fractions in light oil are introduced to the temperature-raising region 5 in a liquid state at below 330° C., they are easily adhered onto the surface of the catalyst, and are therefore supplied from the pump 3 by a small quantity, by command of the controller 9. Furthermore, for example at below 200° C., operation of the pump 3 is stopped by command of the controller 9. On the other hand, for example at equal to or higher than 330° C. and below 500° C., supply amount of hydrocarbon-based fuel is adjusted, so that target temperature is attained.

The pressure sensor 10 at the entrance of the temperature-raising region 5 is mounted in the case where the pressure sensor 11 is not mounted between the temperature-raising region 5 and the filtering region 6, and is designed to detect pressure on the temperature-raising region 5 and the filtering region, and measure pressure on the temperature-raising catalyst and the filtering region, based on difference between the pressure sensor 10 and the pressure sensor 12.

In the control unit 9, generally, after pressure on the filter is measured, information on temperature and pressure backward and forward of the filter (or inside the filter) are sent to the control unit, and when they are over a certain value, a fuel supply signal is sent to a fuel injection apparatus to start filter regeneration control (fuel supply). Also during fuel supply, pressure value of the filter is sent to the control unit by the pressure sensor, and at the time when the pressure value is lowered to a certain value, regeneration control is stopped.

In this case, as hydrocarbon, any one may be used as long as generating heat by combustion reaction, and includes methane, ethane, propane, gasoline, methanol, ethanol, dimethyl ether, light oil or the like, and light oil is preferable. Use amount thereof is 1,000 to 40,000 ppm, preferably 5,000 to 30,000 ppm, further preferably 5,000 to 20,000 ppm, and most preferably 5,000 to 15,000 ppm, as converted to methane, relative to exhaust gas. Small use amount of hydrocarbon requires plurality times of the addition to raise temperature to target value, and thus has a problem that temperature cannot be rapidly raised. In addition, as shown in FIG. 9, concentration of total hydrocarbon supplied below 1,000 ppm, is not capable of providing effect of the present invention. On the other hand, high use amount of hydrocarbon tends to easily generate hydrocarbon poisoning as described above, and has a problem of easy reduction of catalytic performance, and incurs another problem of cost increase, because temperature of exhaust gas in supplying hydrocarbon must be controlled to be raised by engine control, or amount of catalytically active components must be increased.

It should be noted that the upstream of exhaust gas in the present invention, means any region at the upstream of the temperature-raising catalyst, however, preferably the upstream of the temperature-raising catalyst from the posterior region of the combustion in an engine. In addition, "the posterior region of the combustion in an engine" may be at the downstream from an engine, or may be inside an engine.

Here, introduction temperature of hydrocarbon is 200 to 600° C., preferably 200 to 600° C., and further preferably 200 to 300° C.

In addition, introduction temperature is similar, also in the case where hydrocarbon-based liquid (fuel) is directly supplied in an internal-combustion engine.

The temperature-raising catalyst used in the present invention has a catalyst component supported on the refractory three-dimensional structure, wherein concentration of said components has a gradient such that said concentration gradually becomes lower from the inflow side toward the outflow side of said exhaust gas. And the temperature-raising catalyst has the catalytically active components (A) comprising at least one kind of a noble metal selected from the group consisting of platinum, palladium and rhodium, supported onto the refractory inorganic oxide powders (B). That is to say, The temperature-raising catalyst of the present invention comprises the refractory three-dimensional structure, the catalytically active components (A), and the refractory inorganic oxide powders (B)

In addition, supporting amount of the catalytically active components (A) in the temperature-raising catalyst is 0.2 to 20 g/l, preferably 1 to 15 g/l, and supporting amount of the refractory inorganic oxide powders (B) is 10 to 300 g/l, preferably 20 to 200 g/l.

Among the above-described noble metals, platinum is preferable, and platinum-palladium and/or rhodium may also be preferable. Mass ratio thereof is 20/1 to 1/1, preferably 5/1 to 2/1.

As a starting material of platinum, an inorganic compound such as platinum nitrate, dinitrodiammine platinum, chloroplatinic acid or the like; or an organic compound such as bisplatinum or the like is included. In addition, as a starting material of rhodium, rhodium nitrate, rhodium chloride, rhodium acetate or the like is included; and as a starting material of palladium, palladium nitrate, palladium chloride, palladium acetate or the like is included.

Refractory inorganic oxide components used in the present invention may be anyone, as long as usually used as a catalyst carrier, for example, activated alumina such as α-alumina, or γ, δ, η, θ-alumina; zeolite, titania, or zirconia, titania, silicon oxide, or a complex oxide thereof, for example, alumina-titania, alumina-zirconia, titania-zirconia, or the like can be used, however, powders of activated alumina are preferable. Use amount of the refractory inorganic oxide is usually 10 to 300 g, preferably 50 to 150 g per 1 litter of a one-piece structure. The use amount below 10 g is not capable of providing sufficient dispersion of a noble metal, and provides insufficient durability, while, the amount over 300 g deteriorates a contact condition between the noble metal and hydrocarbon introduced for temperature raising, which makes temperature increase difficult, and thus not preferable.

BET specific surface area of the refractory inorganic oxide is 50 to 750 $m^2/g$, preferably 150 to 750 $m^2/g$. In addition, average particle diameter of the refractory inorganic oxide powders is 0.5 to 150 μm, preferably 1 to 100 μm.

An example of catalyst components in the above-described catalyst includes, for example, one composed of platinum and palladium, as the catalytically active components (A), and activated alumina and β-zeolite, as the refractory inorganic oxide powders (B).

As for specific descriptions of a method for preparation of the temperature-raising catalyst, according to the present invention, the catalyst is obtained by immersing the three-dimensional structure in slurry containing the catalytically active components in a predetermined concentration, composed of the catalytically active components and the refractory inorganic oxide powders, by the following methods:

(a) In the case where the three-dimensional structure is a honeycomb type, the three-dimensional structure is immersed as a whole, and then pulled up to be subjected to drying and calcinating in air atmosphere. Then, the resultant three-dimensional structure coated with the catalytically active components is partially immersed and then subjected to drying and calcinating. Furthermore, by subjecting the three-dimensional structure coated with the catalytically active components with a partially thick part, to the above immersion and drying in sequentially repeated times as needed, such a catalyst is obtained that has the thickest coating at one end, and sequentially decreasing thickness toward the other end, in response to repeating times of the above procedure.

(b) In the case where the three-dimensional structure is a honeycomb type, a method for partially and sequentially coating with a solution of the catalytically active components, after coating only a base substrate with the above described catalyst components.

(c) In the case where the three-dimensional structure is a honeycomb type, a method for partially coating, for example up to ⅓, with a slurry containing high concentration catalytically active components, and then coating the residual part, for example ⅔, with a slurry containing low concentration catalytically active components, from the opposite side.

(d) In the case where the three-dimensional structure is a honeycomb type, a method for partially coating, for example up to ⅓, with a slurry containing high concentration catalytically active components, and then partially coating, for example ⅓, with a slurry containing low concentration catalytically active components, from the opposite side (It is important that more catalytically active components are present at the inflow side).

(e) The three-dimensional structure is divided into a plurality of pieces, and each of the pieces is subjected to immersing by sequentially changing concentration of catalytically active components in the catalyst component, and drying, to prepare those each having different supporting amount of the catalytically active components, and then arranging them sequentially in series so that they are communicated in pass, and arranging those with higher concentration at the inflow side of exhaust gas.

(f) In the case where the three-dimensional structure is a pellet type, plurality kinds of pellets having different amount of the catalytically active components are prepared, and those supporting higher amount of the catalytically active components are filled at the inflow side of exhaust gas, and then those supporting lower amount are filled sequentially.

In the above-described method, it is important that the catalytically active components are supported with concentration gradient so that the concentration becomes lower from the inflow side toward the outflow side of the exhaust gas, and the amount of the catalytically active components in 50% of the inflow side is more than the amount of the catalytically active components in 50% of the outflow side; preferably, the catalytically active components in 10 to 66.7% of the total length from the inflow side is 20 to 80% of total (total amount of catalytically active components is 100%); and further preferably, the catalytically active components in 30 to 66.7% of the total length from the inflow side is 50 to 80% of total. The case where the supporting amount of the catalytically active components are set more only at the inflow part is not preferable, because hydrocarbon is not combusted sufficiently at the outflow side as compared with the inflow side; and combustion of hydrocarbon, and presence of the catalytically active components necessary to maintain combustion result in suppression of poisoning by hydrocarbon, combustion of hydrocarbon, and increase in temperature of exhaust gas. As mentioned above, it is only necessary to support catalytically active components with concentration gradient lowered from the inflow side toward the outflow side of said exhaust gas. It is not necessary to support catalyst components excluding catalytically active components with such concentration gradient. However, it is preferable that catalyst components excluding catalytically active components are supported with concentration gradient lowered from the inflow side toward the outflow side with the same rate as the concentration gradient of catalytically active components.

The temperature-raising catalyst is obtained by drying the three-dimensional structure coated with these catalyst components, and subsequently calcinatng at 300 to 1200° C., preferably 300 to 800° C., more preferably 400 to 600° C., for 15 minutes to 2 hour, preferably for 30 minutes to 1 hour.

As zeolite used as needed, a BEA type, an MFI type, an FER type, an FAU type, an MOR type or the like is included, however, not especially limited because a preferable crystal structure is different in response to objects.

As a refractory three-dimensional structure on which the above-described catalyst components are coated, a heat resistant carrier like a honeycomb carrier or the like is included, however, a one-piece molded type honeycomb structure is preferable, and a monolith honeycomb carrier, a metal honeycomb carrier, a plug honeycomb carrier or the like, or a pellet carrier or the like, although not a three-dimensional one-piece structure, is also included.

As a monolith carrier, usually one named ceramic honeycomb carrier may be preferable, and in particular, a honeycomb carrier made of a material such as cordierite, mullite, α-alumina, zirconia, titania, titanium phosphate, aluminum titanate, petalite, spodumene, aluminosilicate, magnesium silicate or the like is preferable, and among these, a cordierite type one is particularly preferable. In addition, a one-piece structure using an oxidation resistant and heat resistant metal such as stainless steel, a Fe—Cr—Al alloy or the like is used.

It should be noted that, in the case where a pellet carrier is used as the refractory three-dimensional structure, it is desirable that catalysts supporting higher amount of catalytically active components, relative to the pellet carrier made by the above material, are filled at the inflow side of exhaust gas, and catalysts supporting lower amount of catalytically active components are sequentially filled at the inflow side of exhaust gas.

These monolith carriers can be produced by an extrusion molding method, a winding and fastening method for sheet-like elements or the like. The shape of a gas passage opening (cell shape) maybe any one such as a hexagon, a tetragon, a triangle or a corrugated shape. A cell density (cell number/unit cross-section) of 100 to 600 cells/in$^2$ can be sufficiently used, and 200 to 500 cells/in$^2$ is preferable.

In the present invention, a method for coating the NOx storage catalyst is not especially limited, and usually, an impregnation method is preferably used.

As the plug honeycomb used in the present invention, there are many kinds and a known one may be used, and for example, a filter made of cordierite, a filter made of high heat resistant silicon or the like is included.

In addition, as a later stage catalyst, a three-dimensional structure of such as cordierite, silicon carbide, stainless steel or the like; for example, a honeycomb carrier that is capable of collecting particulate substances, and without coated with the catalyst components; for example a diesel particulate filter, a plug filter or the like; one coated with catalyst components similar to the above temperature-raising catalyst onto the above filter; one requiring high temperature in a process of using a catalyst; or the like is included. Furthermore, as a later stage catalyst, an oxidation catalyst, a NOx storage catalyst or the like is included.

EXAMPLES

Then, explanation will be given in detail on a method of the present invention with reference to Examples.

Comparative Example 1

By wet milling of an aqueous solution of dinitrodiammine platinum, as equivalent to 2 g of platinum, an aqueous solution of palladium nitrate, as equivalent to 0.5 g of palladium, and 120 g of activated alumina ($\gamma$-$Al_2O_3$, a BET specific surface area of 200 m$^2$/g, and an average primary diameter of 6 μm), in a ball mill, an aqueous slurry (A) with a total weight of 300 g was prepared. This slurry was coated (wash coated) onto a honeycomb carrier 101 made of cordierite, having 400 cells per 1 cm$^2$ of cross-sectional area, a diameter of 24 mm, and a length of 50 mm, so as to be 122.5 g per 1 litter, as shown in FIG. 2(A) and FIG. 6(A), to form a catalyst layer 102, which was dried at 120° C. for 8 hours, and subsequently subjected to calcinating at 500° C. for 1 hour to yield a catalyst A.

Example 1

As shown in FIG. 2(B), by coating (catalyst layer 102) whole surface of honeycomb carrier 101 made of cordierite similar to Comparative Example 1, with the resultant slurry (A) by a method of Comparative Example 1, so as to be 61.25 g per 1 litter, and by calcinating at 500° C. for 1 hour after drying, and subsequently, using the same slurry (A), by coating (catalyst layer 103) to 66.7% of the total length from the inflow side, so as to be 61.25 g per 1 litter of the honeycomb carrier, followed by drying and calcinating at 500° C. for 1 hour, a catalyst B, wherein amount of the catalytically active components in 50% of the inflow side is more than amount of the catalytically active components in 50% of the outflow side, was obtained.

Example 2

As shown in FIG. 2(C), by coating (catalyst layer 102) whole surface of the honeycomb carrier 101 made of cordierite similar to Comparative Example 1, with the resultant slurry (A) by a method of Comparative Example 1, so as to be 40.8 g per 1 litter, and by calcinating at 500° C. for 1 hour after drying, and subsequently, by coating (catalyst layer 103) to 66.7% of the total length and by calcinating at 500° C. for 1 hour after drying, and further by coating (catalyst layer 104) to 33.3% of the total length from the inflow side, so as to be 40.8 g per 1 litter of the honeycomb carrier, and by calcinating at 500° C. for 1 hour after drying, a catalyst C, wherein amount of the catalytically active components in 50% of the inflow side is more than amount of the catalytically active components in 50% of the outflow side, was obtained.

Example 3

As shown in FIG. 2(D), by coating (catalyst layer 102) whole surface of the honeycomb carrier 101 made of cordierite similar to Comparative Example 1, with the resultant slurry (A) by a method of Comparative Example 1, so as to be 108.9 g per 1 litter, and by calcinating at 500° C. for 1 hour after drying, and subsequently, using the same slurry (A), by coating (catalyst layer 103) to 12.5% of the total length from the inflow side, so as to be 13.6 g per 1 litter of the honeycomb carrier, followed by drying and calcinating at 500° C. for 1 hour, a catalyst D, wherein amount of the catalytically active components in 50% of the inflow side is more than amount of the catalytically active components in 50% of the outflow side, was obtained.

Example 4

Figure 3:
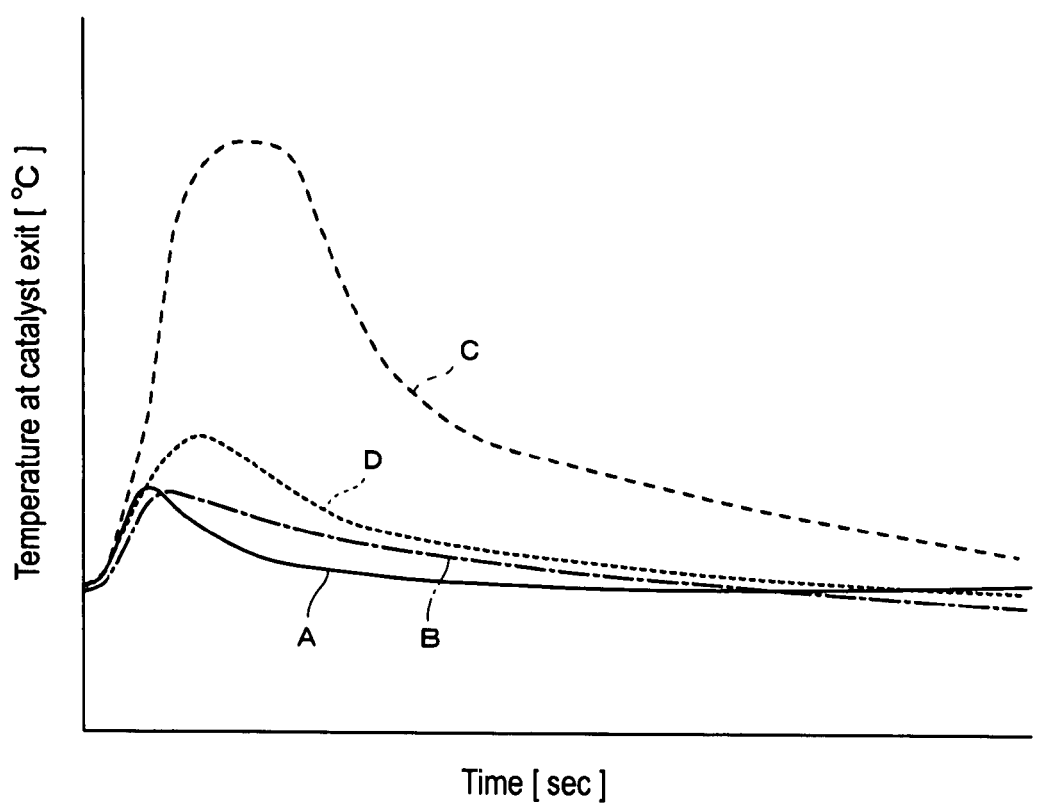
FIG. 3 is a graph showing relationship between temperature at the exit of catalyst and time, in the addition of hydrocarbon, of a temperature-raising catalyst used in the present invention.
Figure 4:
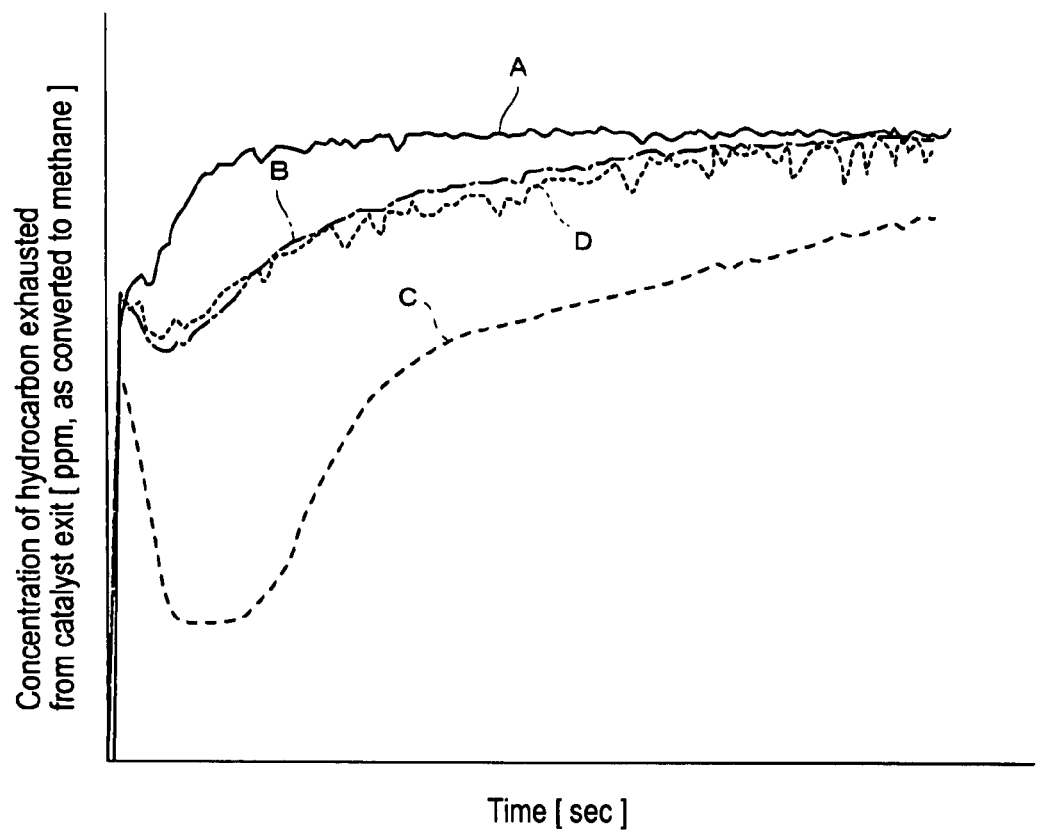
FIG. 4 is a graph showing relationship between concentration of hydrocarbon exhausted from the exit of catalyst and time, in the addition of hydrocarbon, of a temperature-raising catalyst used in the present invention.
Figure 5:
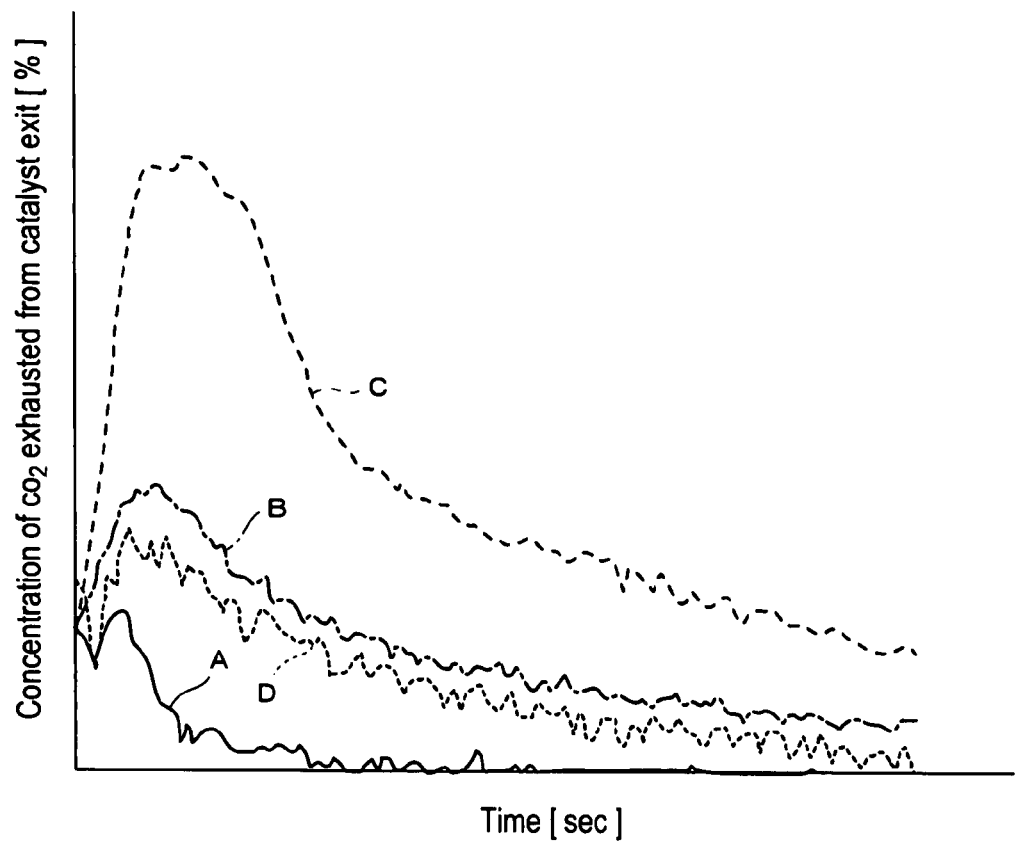
FIG. 5 is a graph showing relationship between concentration of $CO_2$ exhausted from the exit of catalyst and time, in the addition of hydrocarbon, of a temperature-raising catalyst used in the present invention.

Catalysts A, B, C and D with a diameter of 24 mm and a length of 50 mm were fired at 800° C. for 16 hours, and then gas, composed of 500 ppm of NO, 300 ppm of CO, 10% of $O_2$, 6% of $CO_2$, 6% of $H_2O$ and nitrogen as the remainder, as exhausted gas, was passed through each of them, in an S.V. (space velocity) of 50,000 hr$^{-1}$, and at the time when temperature of the catalyst layer was stabilized at 200° C., hydrocarbon composed of 2,000 ppm (as converted to methane, the same hereafter) of propane and 8,000 ppm of propylene was passed through (condition 1), to measure temperature at the exit of the catalyst in this case, with passage of time; and the result of FIG. 3 was obtained. In addition, concentration of hydrocarbon at the exit of the catalyst layer in this case, was measured with passage of time; and the result of FIG. 4 was obtained; further, concentration of $CO_2$ at the exit of the catalyst layer in this case, was measured with passage of time; and the result of FIG. 5 was obtained.

Comparative Example 2

As shown in FIG. 6(E), by coating (catalyst layer 202) whole surface of the honeycomb carrier 201 made of cordierite similar to Comparative Example 1, with the resultant slurry (A) by a method of Comparative Example 1, so as to be 40.8 g per 1 litter, and by calcinating at 500° C. for 1 hour after drying, and subsequently, by coating (catalyst layer 203) to 66.7% of the total length from the outflow side, and by calcinating at 500° C. for 1 hour after drying, and further by coating (catalyst layer 204) to 33.3% of the total length from the outflow side, so as to be 40.8 g per 1 litter of the honeycomb carrier, and by calcinating at 500° C. for 1 hour after drying, a catalyst E, wherein amount of the catalytically active components in 50% of the inflow side is less than amount of the catalytically active components in 50% of the outflow side, was obtained.

Comparative Example 3

As shown in FIG. (F), by coating (catalyst layer 202) whole surface of the honeycomb carrier 201 made of cordierite similar to Comparative Example 1, with the resultant slurry (A) by a method of Comparative Example 1, so as to be 108.9 g per 1 litter, and by calcinating at 500° C.

for 1 hour after drying, and subsequently, using the same slurry (A), by coating (catalyst layer 203) to 12.5% of the total length from the outflow side, so as to be 13.6 g per 1 liter of the honeycomb carrier, and by calcinating at 500° C. for 1 hour after drying, a catalyst F, wherein amount of the catalytically active components in 50% of the inflow side is less than amount of the catalytically active components in 50% of the outflow side, was obtained.

Comparative Example 4

Catalysts A, E and F were fired at 800° C. for 16 hours, and then gas, composed of 500 ppm of NO, 300 ppm of CO, 10% of $O_2$, 6% of $CO_2$, 6% of $H_2O$ and nitrogen as the remainder, as exhausted gas, was passed through each of them, in an S.V. (space velocity) of 50,000 $hr^{-1}$, and at the time when temperature of the catalyst layer was stabilized at 200° C., hydrocarbon composed of 2,000 ppm (as converted to methane, the same hereafter) of propane and 8,000 ppm of propylene was passed through (condition 1), to measure temperature at the exit of the catalyst in this case, with passage of time; and the result of FIG. 7 was obtained.

Comparative Example 5

Catalysts A and C were calcinated at 800° C. for 16 hours, and then gas, composed of 500 ppm of NO, 300 ppm of CO, 10% of $O_2$, 6% of $CO_2$, 6% of $H_2O$ and nitrogen as the remainder, as exhausted gas, was passed through each of them, in an S.V. (space velocity) of 50,000 $hr^{-1}$, and at the time when temperature of the catalyst layer was stabilized at 250° C., 10,000 ppm (as converted to methane) of light oil was passed through (condition 2), to measure concentration of hydrocarbon at the exit of the catalyst in this case, with passage of time; and the result of FIG. 8 was obtained.

Comparative Example 6

Catalysts A and C were calcinated at 800° C. for 16 hours, and then gas, composed of 500 ppm of NO, 300 ppm of CO, 10% of $O_2$, 6% of $CO_2$, 6% of $H_2O$ and nitrogen as the remainder, as exhausted gas, was passed through each of them, in an S.V. (space velocity) of 50,000 $hr^{-1}$, and at the time when temperature of the catalyst layer was stabilized at 200° C., hydrocarbon composed of 200 ppm (as converted to methane, the same hereafter) of propane and 800 ppm of propylene was passed through (condition 3), to measure concentration of hydrocarbon at the exit of the catalyst in this case, with passage of time; and the result of FIG. 9 was obtained.

Comparative Example 7

Catalysts A and C were calcinated at 800° C. for 16 hours, and then gas, composed of 500 ppm of NO, 300 ppm of CO, 10% of $O_2$, 6% of $CO_2$, 6% of $H_2O$ and nitrogen as the remainder, as exhausted gas, was passed through each of them, in an S.V. (space velocity) of 50,000 $hr^{-1}$, and at the time when temperature of the catalyst layer was stabilized at 200° C., hydrocarbon composed of 600 ppm (as converted to methane, the same hereafter) of propane and 2,400 ppm of propylene was passed through (condition 4), to measure concentration of hydrocarbon at the exit of the catalyst in this case, with passage of time; and the result of FIG. 10 was obtained.

The entire disclosure of Japanese Patent Application No. 2006-193072 filed on Jul. 13, 2006 including specification, claims, drawings and summary are incorporated herein by reference in its entirety.

The invention claimed is:

1. A method for purification of exhaust gas from an internal-combustion engine comprised by:
   providing a temperature-raising catalyst for exhaust gas from an internal-combustion engine in an exhaust gas passage of the internal-combustion engine, along flow of said exhaust gas, at an upstream side of a purification catalyst for said exhaust gas, a temperature of the exhaust gas increasing along the flow of the exhaust gas from an upstream side to a downstream side of the temperature-raising catalyst; and
   introducing hydrocarbon in an amount of 1,000 to 15,000 ppm, as converted to methane, at a temperature in the range of 200 to 350° C., from the upstream side of the temperature-raising catalyst, when a gas obtained from the temperature-raising catalyst is fed to the purification catalyst, catalytic activity of the temperature-raising catalyst not decreasing after introducing the hydrocarbon,
   wherein said temperature-raising catalyst has catalytically active components (A) supported onto refractory inorganic oxide powders (B) having a three-dimensional structure, wherein concentration of said components has a gradient such that said concentration gradually becomes lower from an inflow side toward an outflow side of said exhaust gas,
   wherein the catalytically active components (A) comprise at least one of a noble metal selected from the group consisting of platinum, palladium and rhodium,
   wherein a supporting amount of the catalytically active components (A) in said temperature-raising catalyst is 0.2 to 20 g/liter of the catalyst, and a supporting amount of said refractory inorganic oxide powders (B) is 10 to 300 g/liter of the catalyst,
   wherein a supporting amount of the catalytically active components (A) of the catalyst component, in said temperature-raising catalyst, in 10 to 66.7% of the total length from the inflow side of said exhausted gas on said refractory three-dimensional structure, is 20 to 80% of total catalytically active components (A), and a supporting amount of the catalytically active components (A) in 50% of the length of the inflow side is more than a supporting amount of the catalytically active components (A) in 50% of the outflow side, and
   wherein said gradient is formed stepwise.

2. The method according to claim 1, wherein an introduction amount of said hydrocarbon is 5,000 to 15,000 ppm, as converted to methane, relative to said exhaust gas.

3. The method according to claim 1, wherein said exhaust gas temperature-raising catalyst also has capability of exhaust gas purification.

4. The method according to claim 1, wherein said purification catalyst is at least one selected from the group consisting of a diesel particulate filter, an oxide catalyst and a NOx storage catalyst.

5. The method according to claim 1, wherein the three-dimensional structure of said purification catalyst is a honeycomb and/or a plug honeycomb or a pellet.

6. The method according to claim 1, wherein the three-dimensional structure is made of cordierite.

7. The method according to claim 1, wherein the method is free of poisoning of the temperature-raising catalyst by the hydrocarbon.

8. The method according to claim 1, wherein said noble metal comprises (a) platinum and (b) palladium or rhodium.

9. The method according to claim 8, wherein a mass ratio of platinum/palladium or rhodium is in a range of 20/1-1/1.

10. The method according to claim 1, wherein the hydrocarbon is liquid hydrocarbon.

11. The method according to claim 10, wherein the liquid hydrocarbon is light oil.

12. The method according to claim 1, wherein if a value of a temperature sensor located between the temperature-raising catalyst and the purification catalyst exceeds a predetermined value, action of a fuel charging pump stops.

13. The method according to claim 12, wherein the predetermined value is 700° C.

14. The method according to claim 1, wherein said noble metal comprises (a) platinum and (b) palladium.

15. The method according to claim 14, wherein an amount of said catalytically active components (A) is in a range of 1-15 g/liter of the catalyst and an amount of said refractory inorganic oxide powders (B) is in a range of 20-200 g/liter of the catalyst.

16. The method according to claim 14, wherein a mass ratio of platinum/palladium is in a range of 5/1-2/1.

* * * * *